Oct. 25, 1927. 1,647,051
D. H. NOYES
DIRECTION SIGNAL
Filed May 8, 1926   2 Sheets-Sheet 1

Inventor
D. H. Noyes
By Attorneys
Southgate Fay & Hartley

Oct. 25, 1927.
D. H. NOYES
1,647,051
DIRECTION SIGNAL
Filed May 8, 1926 2 Sheets-Sheet 2
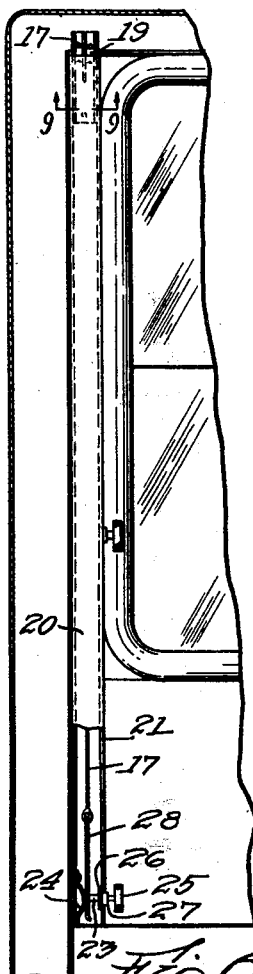
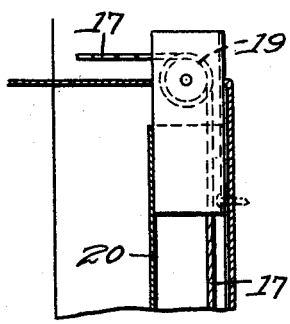
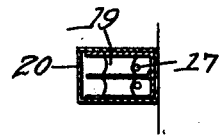
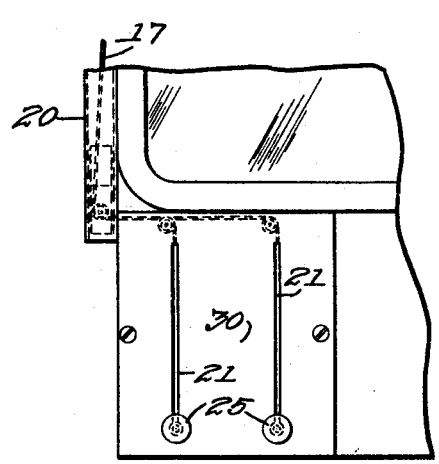
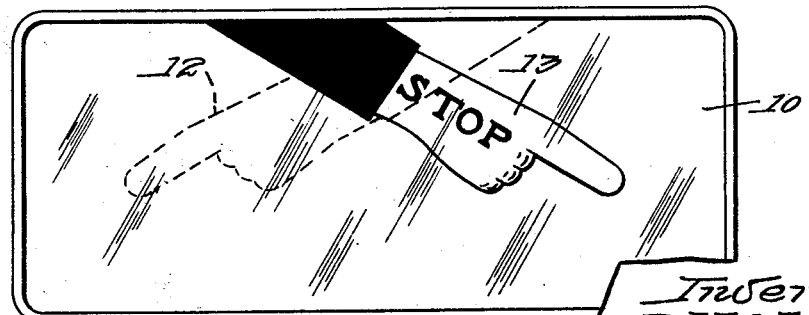
Inventor
D. H. Noyes
By Attorneys
Southgate Fay & Hardy Patented Oct. 25, 1927.

1,647,051

UNITED STATES PATENT OFFICE.

DANIEL H. NOYES, OF ATHOL, MASSACHUSETTS.

DIRECTION SIGNAL.

Application filed May 8, 1926. Serial No. 107,738.

The principal objects of this invention are to provide an unmistakable signal displayed at the rear of an automobile at a point right in front of the driver of the following car which will show the direction in which the driver intends to turn; to provide efficient and simple means for operating the same from the dash-board; to provide a device which can be operated without the necessity of the driver letting go of the wheel by either hand except for an instant; and to provide a construction which can be seen clearly for a long distance and yet the driver himself can see it in his own mirror so that he knows that it is operating.

Other objects and advantages of the invention will be hereinafter described.

Reference is to be had to the accompanying drawings in which

Fig. 6 is a view of one side of the dash showing parts in section to illustrate the connections for operating the signal;

Fig. 7 is a fragmentary longitudinal sectional view at the front of the car showing the course of the operating cord or cable over the front pulley;

Fig. 8 is a side view of the operating means shown in Fig. 6;

Fig. 9 is an enlarged sectional view on the line 9—9 of Fig. 6;

Fig. 10 is a rear view of the signal showing it as it appears to the driver of a following car; and Fig. 11 is a view of a modification corresponding to Fig. 8.

The main object of this invention is to provide a signal device which will be under the control of the operator as much as his own hand and will be unmistakable to anybody in the car following. For this purpose I provide the rear window 10 of a closed car with a casing 11 of wood or the like just above it. In this I pivot two arms 12 and 13, each one having a hand on the end pointing outwardly. These two arms are pivoted at opposite ends of the casing 11 and adapted to swing down in the manner indicated, one to show turning to one side and the other to the other.

Figure 1:
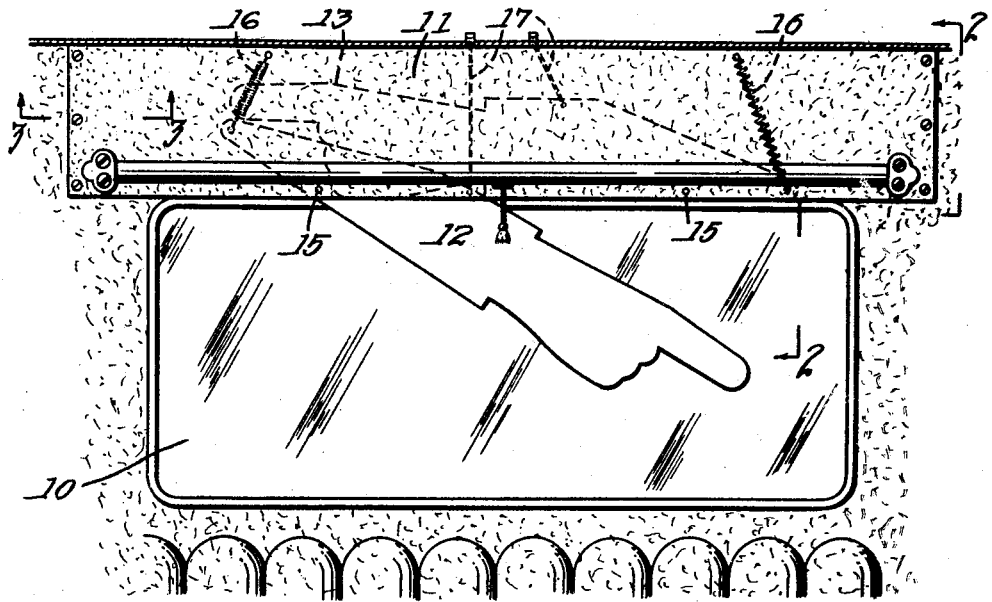
Fig. 1 is a view of a preferred embodiment of this invention as seen from the inside of the car.
Figure 3:
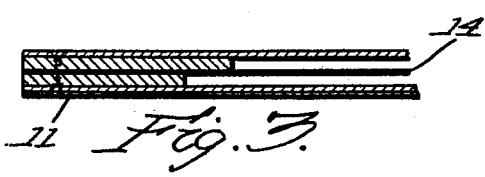
Fig. 3 is a fragmentary sectional view on the line 3—3 of Fig. 1.
Figure 2:
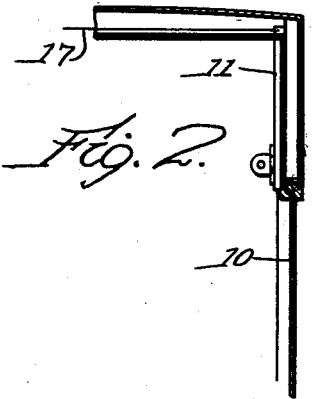
Fig. 2 is a sectional view on the line 2—2 of Fig. 1.
Figure 4:
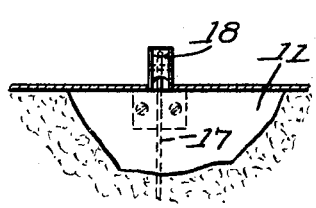
Fig. 4 is a detail sectional view showing the roller over which the operating cord or cable passes.
Figure 5:
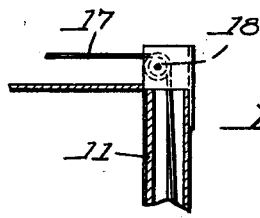
Fig. 5 is a side view of the same partly in section.

When drawn upwardly, these arms are enclosed in the wooden box or casing 11 as indicated by the dotted one in Fig. 1. This casing can have two compartments as shown in Fig. 3 separated by a partition 14 if desired, but it is located above the window so that it cannot be seen. It will be obvious that each arm 12 and 13 is so shaped that it projects down far enough so as to indicate a cuff or sleeve and the whole hand which can be marked with the proper word.

Each one of these arms is pivoted on a stud 15 and a spring 16 is connected with the end to normally pull it down into display position. In other words, the springs act to display the arms and means has to be provided for holding them back against the pressure of the springs when it is desired not to display them. This means consists in each case of a rope or cable 17 which extends up over a roller 18 and along the car to another swivelled roller 19. Of course there are two of these rollers separately mounted in each case so as not to interfere with each other. The cables extend down into a casing or tube 20 at the side of the front of the car over the dash. This tube is provided with two slots 21 each having an enlargement 22 at the bottom. At the bottom of the cable there is a rod 23 having a button 25 on the end. The rod is adapted to come into contact with a stationary spring 24 to apply friction to hold it against the front of the side of the casing 20. On the rod there is a plate 26 to bear against the casing and a disc 27 to enter the opening 22. On the bottom of the cable 17 there is a pivoted flat piece 28 on which the pin 23 is mounted to move in the slot 21.

In the operation of the device, the two buttons 25 are pulled down into the lower ends of the slots 21 where the discs 27 will enter the enlargements 22 of the slots and will be pushed into them by the springs 24 located behind them. This holds both of the arms 12 and 13 up in the casing 11. When it is desired to turn in either direction, the proper one of these buttons 25 is pushed in so that the rod 23 can be slid upwardly in its slot 21. That results in the lowering of the proper arm 12 or 13 as the case may be.

The operator does not have to reach far from the steering wheel to do this. In fact, he does not have to push the button 25 upwardly along the slot, but merely releases it so that the spring 16 can do the rest. He can see in his mirror whether his signal is in operation and the signal itself is clearly displayed to anybody located at the rear. In Fig. 11 I have shown the slots 21 located at the same level in a casing 30, but otherwise the arrangement is the same.

Although I have illustrated and described only two forms of the invention, I am aware of the fact that other modifications can be made therein by any person skilled in the art without departing from the scope of the invention as expressed in the claims. Therefore, I do not wish to be limited to all the details of construction herein shown and described, but what I do claim is:

1. In a direction signal, the combination with a movable signal at the rear, and a flexible cord for operating it, of a casing located at the dash for receiving the operating end of said cord, a spring in the casing against which the operating end is adapted to press when pulled downwardly, said casing having a vertical slot therethrough provided with an enlargement at the bottom, a rod on the end of the cable projecting through said slot, a plate on the rod behind the wall adapted to be pressed closely against it when in contact with said spring, a disc on the rod adapted to enter the enlargement and positively hold the cable down, and a button on the rod outside the casing for raising and lowering it, whereby the cable will be held down when forced to the bottom of the slot.

2. In a direction signal, the combination with a movable signal and a flexible cord for operating it, of a casing located at the dash for receiving the operating end of said cord, a spring in the casing against which the operating end is adapted to press when pulled downwardly, said casing having a vertical slot therethrough, a rod on the end of the cable projecting through said slot, and a button on the rod outside the casing for releasing the rod and raising and lowering it, to display or retract the signal.

In testimony whereof I have hereunto affixed my signature.

DANIEL H. NOYES.